No. 729,387. PATENTED MAY 26, 1903.
E. L. McCLAIN.
BACK BAND HOOK.
APPLICATION FILED JULY 5, 1902.
NO MODEL.
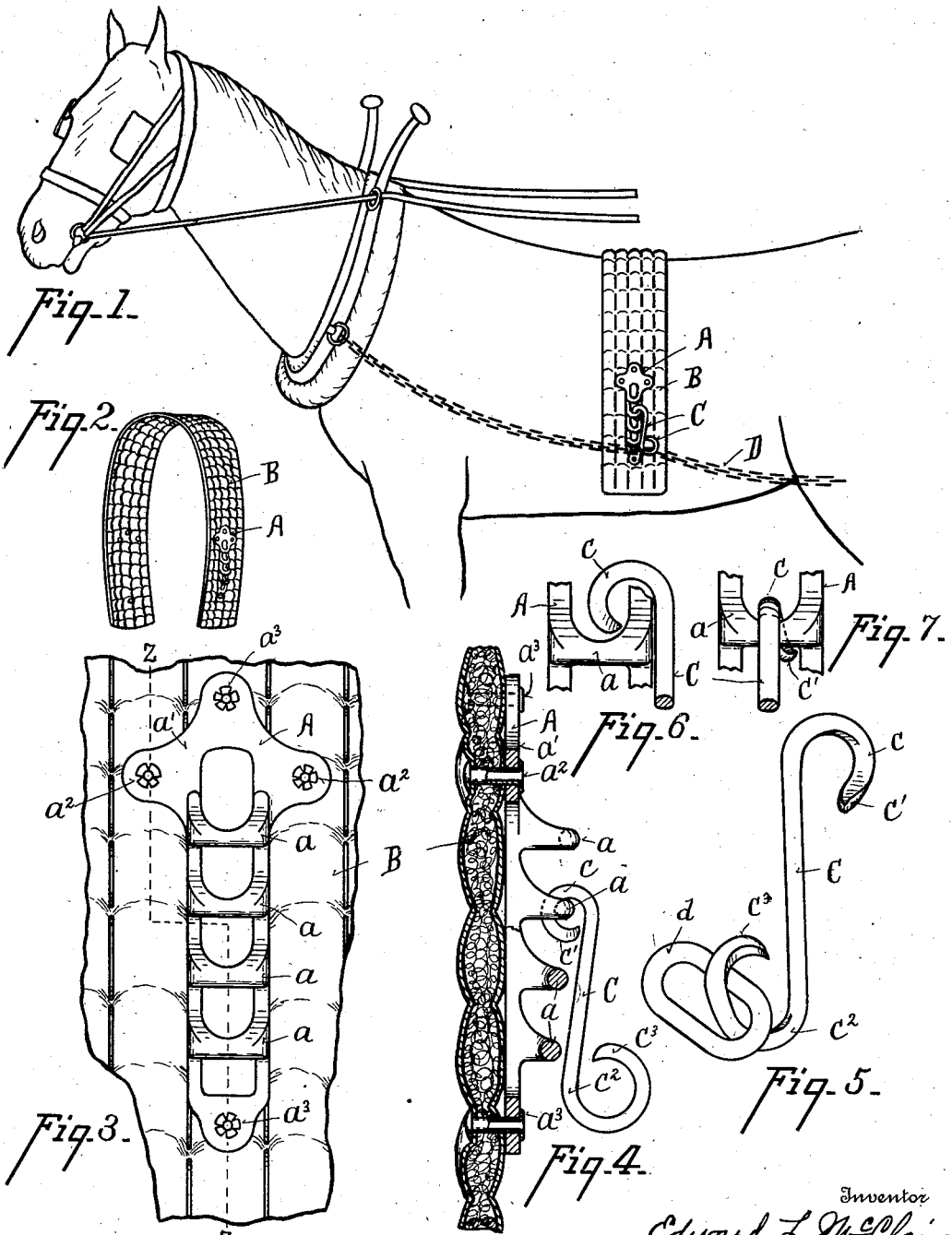
Witnesses
C. W. Miles,
A. McCormack
Inventor
Edward L. McClain
By Murray & Murray
Attorneys No. 729,387.

Patented May 26, 1903.

UNITED STATES PATENT OFFICE.

EDWARD L. McCLAIN, OF GREENFIELD, OHIO.

BACK-BAND HOOK.

SPECIFICATION forming part of Letters Patent No. 729,387, dated May 26, 1903.

Application filed July 5, 1902. Serial No. 114,378. (No model.)

*To all whom it may concern:*

Be it known that I, EDWARD L. MCCLAIN, a citizen of the United States of America, and a resident of Greenfield, county of Highland, State of Ohio, have invented certain new and useful Improvements in Back-Band Hooks, of which the following is a specification.

The object of my invention is a back-band hook having a series of loops which enable the band upon which it is attached to be used upon various-sized horses, which may be adjusted readily to change it for one or for another horse, is adapted to engage different kinds and sizes of chains, and in which when in use the link contacts only the loop which it is engaging. This object is attained by the means described in the specification, and illustrated in the accompanying drawings, in which—

Figure 1 is a side elevation of a back-band hook embodying my invention attached to a back-band, which is shown in position upon a horse. Fig. 2 is a perspective view of a back-band with a back-band hook attached thereto. Fig. 3 is a detail elevation of the hook embodying my invention, the link being removed therefrom. Fig. 4 is a central sectional view of the same. Fig. 5 is a detail perspective view of the link, the link of the chain being shown engaged thereby. Fig. 6 is a detail view showing manner of engaging the hook at the upper end of the link with one of the loops of the back-band hook. Fig. 7 is a similar view showing hook in place.

Referring to the parts, attached to the metal frame A are a series of horizontal U-loops which are situated vertically below each other, each loop projecting out a short distance beyond the loop or hook below it, as illustrated in Fig. 4.

Frame A is enlarged at its upper end $a'$ to receive a series of staples $a^2$ to attach the back-band hook to the back-band B. The lower end of the hook is secured in place upon the back-band by a staple $a^3$.

Link C, which is to couple the trace-chain D to the back-band, has at its upper end a hook $c$, whose end $c'$ projects forward out of the plane of the hook $c$. At its lower end C has a small hook $c^2$, which has an end similar to $c$.

To engage link C with any one of the loops $a$, the link C is held with hook $c$ in a plane substantially parallel to the plane of the frame A, as shown in Fig. 6. The end $c'$ of the link then readily passes loop $a$ into the interior of the hook $c$. When the link hangs down in place, end $c'$ assumes the position shown in Fig. 7, which prevents its being disengaged from loop $a$, its disengagement therefrom being capable of accomplishment only when the link is carried to position shown in Fig. 6. The lower hook $c^3$ engages the link $d$ of the chain D in a manner similar to that in which hook $c$ engages loop $a$. In use it is seen that link C is readily passed through one or the other of loops $a$, according to the size of the horse upon which the back-band B is placed, and that when so engaged it is not apt to be disengaged by accident, and that when engaging one of the upper loops $a$ the link does not in use strike against the lower loops of the hook, as illustrated in Fig. 4. It is likewise apparent that the chain of the trace is likewise little liable to be disengaged from the link C by accident and that it will fit various kinds and sizes of chains.

What I claim is—

A back-band hook having a series of loops arranged one below the other, each loop of the series projecting out beyond the one below it and a link for coupling any one of the loops to a trace, substantially as shown and described.

EDWARD L. McCLAIN.

Witnesses:
ALBERT M. MACKERLEY,
H. N. NEWBECK.